July 23, 1946.        M. C. TEAGUE ET AL        2,404,758
            LAMINATED POROUS ELASTIC FABRIC
                   Filed Dec. 10, 1940
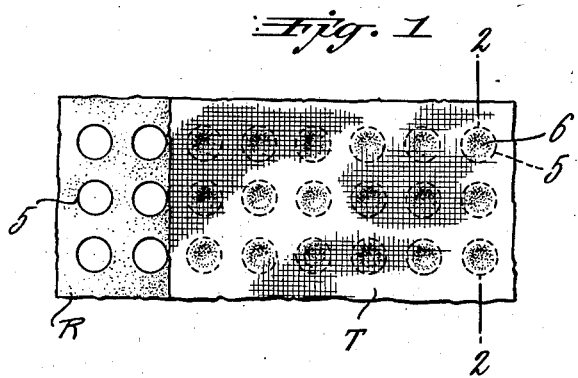
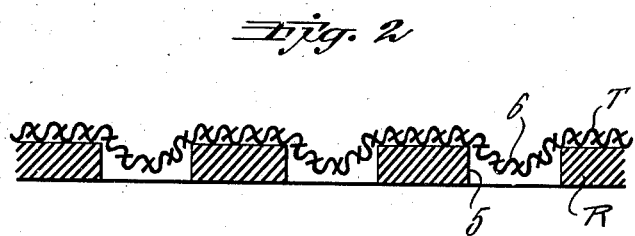
INVENTORS
Merwyn C. Teague
Paul L. Mahoney
BY Lester G. Budlong
ATTORNEY Patented July 23, 1946

2,404,758

UNITED STATES PATENT OFFICE 2,404,758

LAMINATED POROUS ELASTIC FABRIC

Merwyn C. Teague, Ridgewood, N. J., and Paul L. Mahoney, Jackson Heights, N. Y., assignors to United States Rubber Company, New York, N. Y., a corporation of New Jersey Application December 10, 1940, Serial No. 369,477

3 Claims. (Cl. 154—48)

This invention relates to an elastic fabric having a porous rubber backing and the textile fabric extending into the pores. This application is a continuation-in-part of application Serial Number 209,188, filed May 21, 1938.

Heretofore porous rubber backed fabrics have been made by forming perforations in a preformed rubber sheet and adhering it to stretchable knitted fabrics. Such porous rubber backed fabrics have also been made by applying masticated unvulcanized rubber layers to knitted fabrics and perforating the rubber with sharp pointed pins and then subsequently vulcanizing the rubber layer. Fabrics manufactured in this manner are not provided with additional stretch and the textile fabrics do not extend into the pores in the rubber layer and do not perform the functions of the present invention.

In accordance with the present invention the layer of rubber is so combined with the layer of textile fabric that the laminated fabric is provided with additional stretch and the areas of the fabric opposite the pores extend across, into and partially fill them so as to produce a design effect and enable the fabric to transmit moisture therethrough more readily due to the fact that the fabric within the pores acts as a wick to conduct the moisture from one side of the fabric to the other.

The foregoing and other objects of this invention will be more readily understood by referring to the following description and the accompanying drawing, in which:

Fig. 1 is a plan view of the textile fabric side of the laminated porous elastic fabric embodying this invention; and Fig. 2 is a cross-sectional view of the composite fabric shown in Fig. 1, taken on line 2—2.

Referring to the drawing, as shown particularly in Fig. 2, the laminated porous elastic fabric embodying this invention comprises a lamina of rubber R having a layer of textile fabric T, bonded thereto by vulcanization. The textile fabric is made of a knitted, or a loosely woven, or other construction having intermeshing threads but not tightly compacted together. The rubber layer R is provided with a plurality of perforations or pores 5 into which the textile fabric extends and forms craters 6 on the textile fabric side. The craters 6 produce a design effect on the fabric side of the composite fabric, and when the rubber side of the fabric is placed in contact with a moist surface, as when worn on the body as a garment, the portions of the fabric extend in contact with such moist surface and transmits the moisture through the rubber pores due to the wick action of the fibrous textile layer T.

This laminated porous elastic fabric may be made in accordance with the method set forth in our co-pending application Serial No. 209,188, filed May 21, 1938, or in accordance with our application for "Method of making perforated latex rubber films with or without textile fabric backings" filed on the date of the present application and which matured into Patent No. 2,289,151, on July 7, 1942, and is a continuation-in-part of application Serial No. 209,188.

In accordance with one of the methods described in the foregoing applications to which we have referred, a coating of substantially uncoagulated latex is applied to a textile fabric, and the coating is perforated by extending the blunt ends of pins into the coating and removing them therefrom before it has substantially coagulated. The latex is preferably applied to the fabric while it is relatively fluid and is dried to such a viscous condition before it is perforated that the walls of the perforations formed by the pins will not close up after the removal of the pins. The textile fabric is supported by a yieldable backing such as solid soft rubber and the textile fabric is firmly pressed against the solid rubber backing by the ends of the pins. Some of the latex at the ends of the pins is pressed through the textile fabric and some of the latex is withdrawn by the ends of the pins. The latex on the fabric side is then brushed off after it has been coagulated but before it has been completely dried, thereby leaving holes in the rubber layer and the fabric permeable to air and moisture opposite the holes. The latex is then dried to a tacky coagulated condition and adhered to a stretched elastic surface. The tension on the elastic surface is then released so as to contract the coating and simultaneously contract the textile fabric therewith. The rubber coating is partially vulcanized and then removed with the textile fabric from the backing to which it was adhered. The latex coating may then be further vulcanized to the desired point.

After the composite fabric has been removed from the elastic surface to which it was adhered, the threads of the textile fabric extending in the direction in which it has been contracted are shortened and/or buckled in the areas between the pores in the rubber layer R, and the fabric in such condition is referred to as being super-relaxed. When the ends of the pins are removed from the uncoagulated latex coating they cause the textile fabric to be withdrawn into the pores to some extent and when the fabric is contracted this action causes the textile fabric to further extend into the pores and partially fill them.

The term "latex" in the description and claims is used to designate broadly coagulable aqueous dispersions of elastic materials, including artificial dispersions of rubber or rubber-like materials as well as natural latex, which may be preserved, compounded, thickened and/or otherwise treated as desired, as by vulcanization, and which may be in a normal, diluted, concentrated or purified condition produced by methods well known in the art.

The term "latex rubber" is used herein to designate solids deposited in situ from "latex" either by drying or chemical coagulation.

While one form of this invention has been described in detail, it will be understood that changes may be made without departing from the spirit of the invention and the scope of the appended claims.

Having thus described our invention, what we claim and desire to protect by Letters Patent is:

1. An elastic fabric comprising a layer of rubber having pores extending therethrough, a layer of fabric elastically bonded to said layer of rubber, said fabric having threads extending in at least one direction which are normally retained in a relaxed condition by said layer of rubber, and said fabric having continuous portions thereof extending across, into, and at least partially filling substantially all of said pores in said rubber layer.

2. A laminated elastic fabric comprising a lamina of textile fabric and a lamina of rubber bonded together, said lamina of rubber having pores extending therethrough, said lamina of textile fabric being uniformly bonded to said rubber lamina intermediate said pores and the threads thereof extending in at least one direction in such areas being buckled, and said textile fabric in the areas of said pores being extended across, into and at least partially filling substantially all of said pores, said areas of the textile fabric opposite said pores being continuous, and permeable to air and moisture.

3. An elastic fabric comprising a layer of textile fabric, a unitary layer of rubber deposited directly from a rubber containing fluid and adhered by said deposited rubber to said textile fabric, said layer of rubber having a plurality of openings therein surrounded by said rubber layer, said textile fabric in the areas between the openings being retained in a super-relaxed condition by said layer of rubber when it is relaxed, and said textile fabric in the areas opposite said openings in said rubber layer being puckered in respect to said other areas.

MERWYN C. TEAGUE.
PAUL L. MAHONEY.